United States Patent [19]

Rhodes

[11] 3,896,299

[45] July 22, 1975

[54] TRIGONOMETRIC ANALOG-TO-DIGITAL CONVERSION APPARATUS

[75] Inventor: Melvin H. Rhodes, Cedar Rapids, Iowa

[73] Assignee: Rockwell International Corporation, El Segundo, Calif.

[22] Filed: May 28, 1974

[21] Appl. No.: 474,119

[52] U.S. Cl....... 235/150.53; 235/186; 340/347 AD; 235/156

[51] Int. Cl.²...................... G06G 7/22; H03K 13/02

[58] Field of Search..... 235/150.53, 150.52, 150.51, 235/150.5, 186, 189, 152, 156; 340/347 NT, 347 SY, 347 AD

[56] References Cited

UNITED STATES PATENTS

| | | | |
|---|---|---|---|
| 3,624,642 | 11/1971 | Tripp | 235/150.5 X |
| 3,641,563 | 2/1972 | Cushman et al. | 340/347 AD |
| 3,668,693 | 6/1972 | Eaton et al. | 340/347 SY |
| 3,789,393 | 1/1974 | Tripp | 235/186 X |

*Primary Examiner*—Joseph F. Ruggiero
*Attorney, Agent, or Firm*—Bruce C. Lutz

[57] ABSTRACT

Trigonometric conversion apparatus is shown wherein a trial angle is generated and converted to digital sine and cosine of that angle. These digital angle signals are then multiplied times analog cosine and sine, respectively, and their products are compared wherein the difference is used to adjust the initially generated trial angle. When the difference in the two products is zero, the trial angle is considered correct. By measuring the amount of angle change for given time periods, a rate output is also provided.

7 Claims, 6 Drawing Figures

TRIGONOMETRIC ANALOG-TO-DIGITAL CONVERSION APPARATUS

THE INVENTION

The present invention is generally concerned with electronic apparatus and more specifically is concerned with a device for converting analog sine and cosine signals to comparable digital sine and cosine signals along with a digital signal representative of the angle itself and a signal indicative of rate of change of angle.

While there is prior art in converting analog trigonometric functions to digital equivalents of these functions, the present inventive concept provides a relatively simple circuit for providing high resolution and the capability of detecting low angular rates.

The present inventive concept utilizes a multiple step procedure for generating the required angle. While the apparatus is sufficiently fast to follow most continuously changing operations, it would not generally be used where substantially instantaneous conversions of widely differing angles are required. In operation, a trial angle is generated by an analog-to-digital integrator. Upon turn-on, this initial trial angle would normally be zero. This angle is converted to digital signals equivalent to the digital cosine and digital sine of that angle. The two digital signals are then multiplied in analog-to-digital duty cycle multipliers times the sine and cosine, respectively, of the analog angles being converted. Thus, each mutiplier multiplies a sine times a cosine. As will be realized, if the digital and analog signals represent the same angles, the two multiplication products will be identical. If, however, there is a difference, an integrator, which integrates the difference between the two products, will provide an output to alter the trail angle and thus further cycles of the above operation are completed until there is no difference in the two multiplier products and thus no further correction. Of necessity the angle provided by the integrator is a stored value and is continuously updated in each comparison cycle. By noting the amount of angle change in a given cycle, an output indicative of rate can also be provided.

It is, therefore, an object of the present invention to provide improved analog sine and cosine to digital sine and cosine conversion apparatus.

Other objects and advantages of the present invention may be ascertained from a reading of the specification and claims in conjunction with the drawings wherein:

Figure 1:
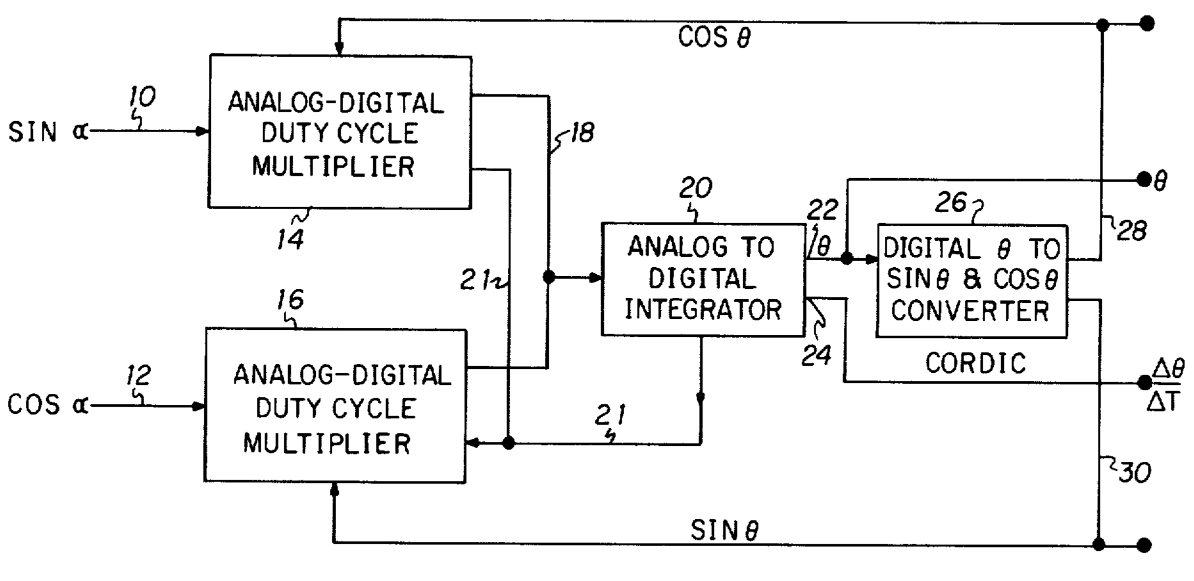
FIG. 1 is a block diagram of the overall inventive concept.
Figure 2:
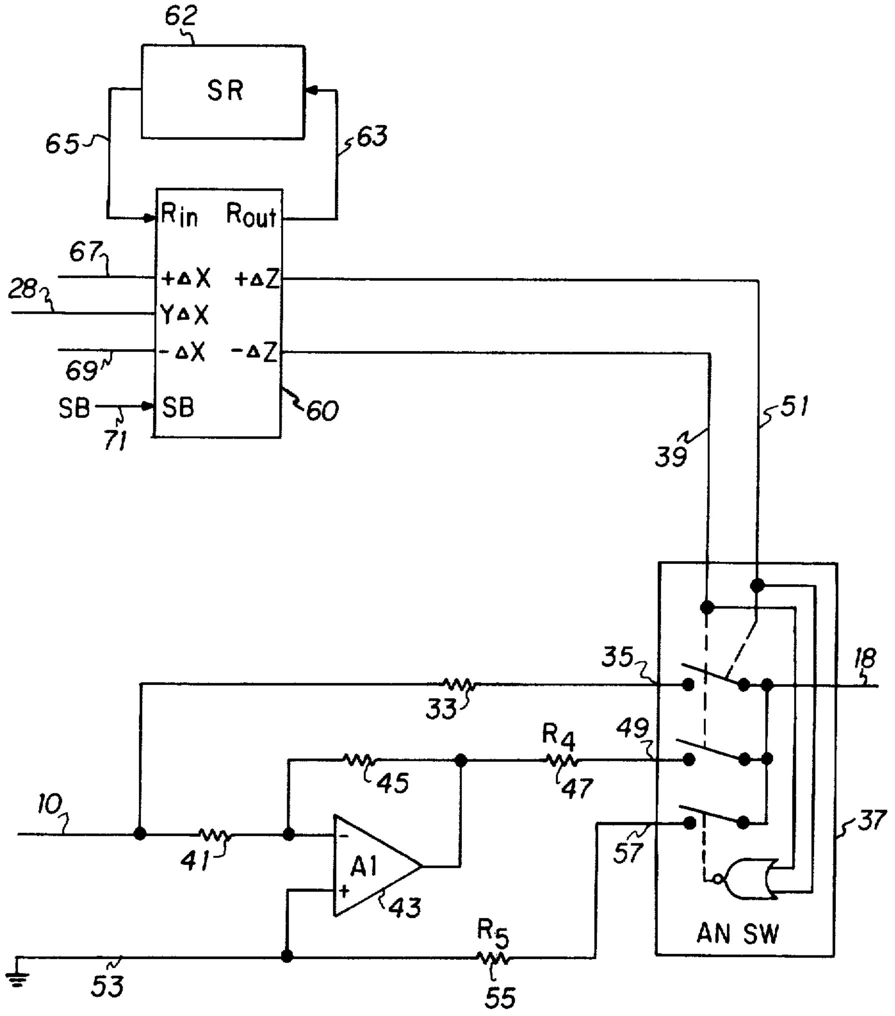
FIG. 2 is a detailed block diagram of a duty cycle multiplier block of FIG. 1.
Figure 3:
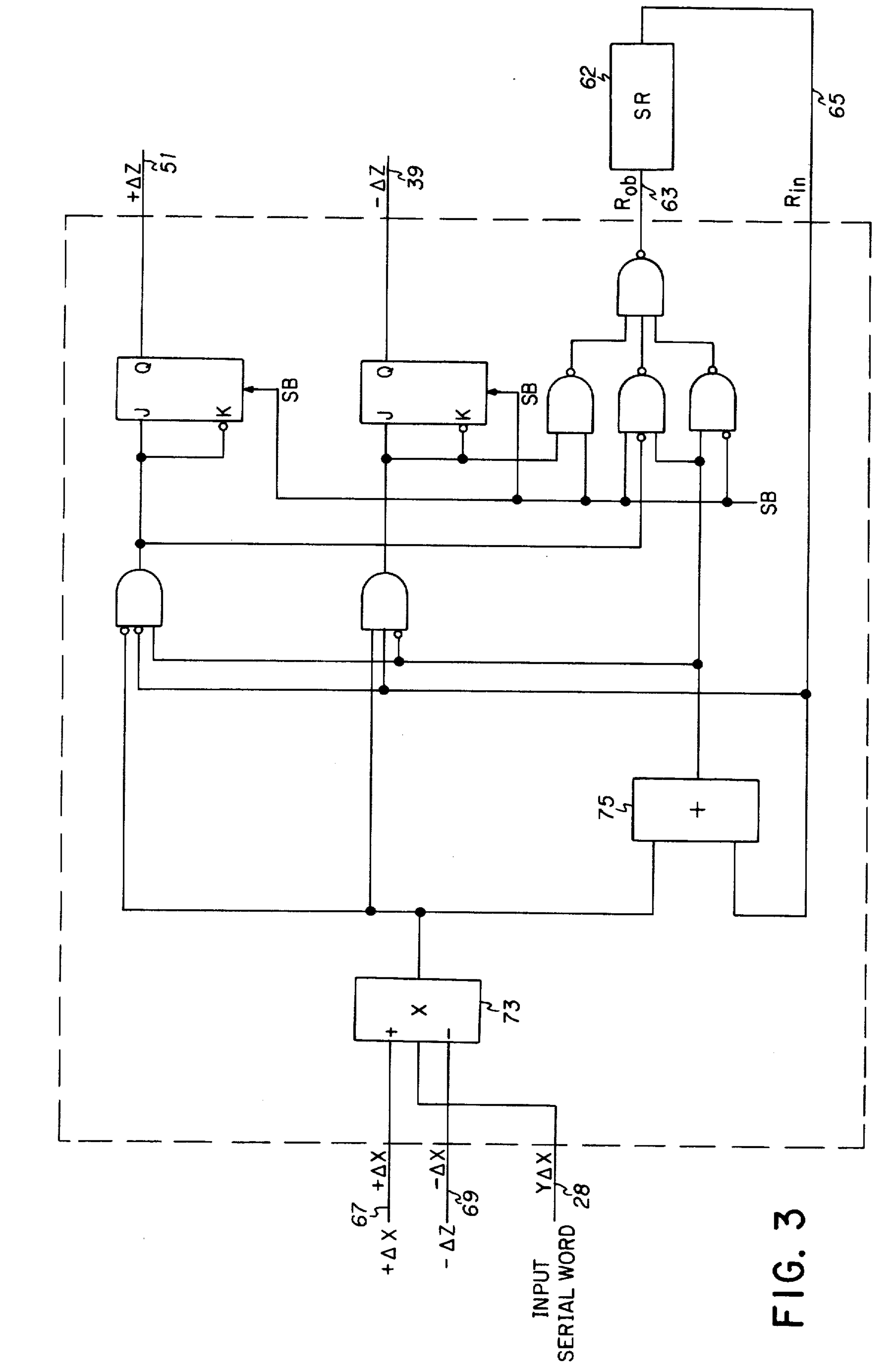
Figure 4:
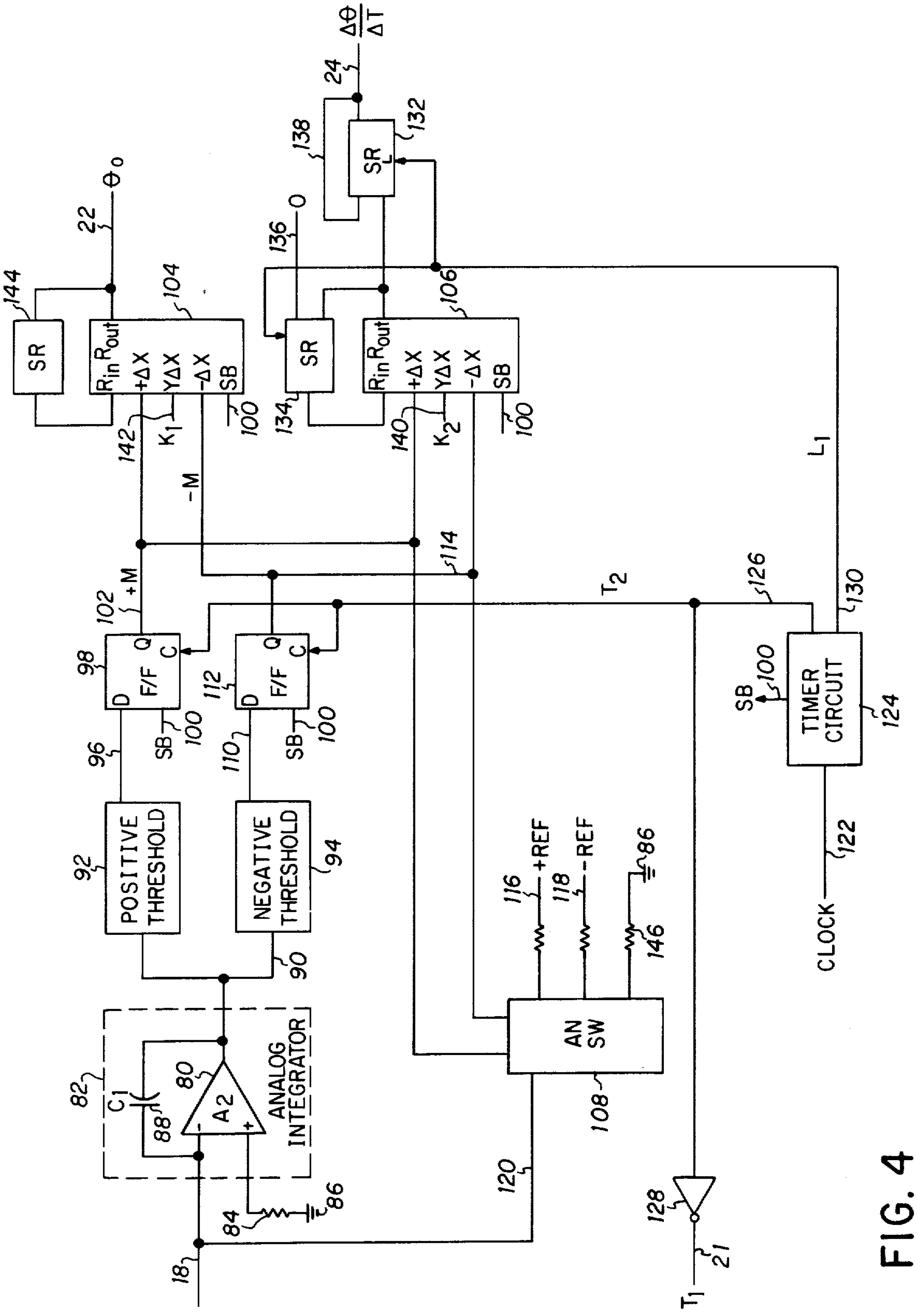
Figure 5:
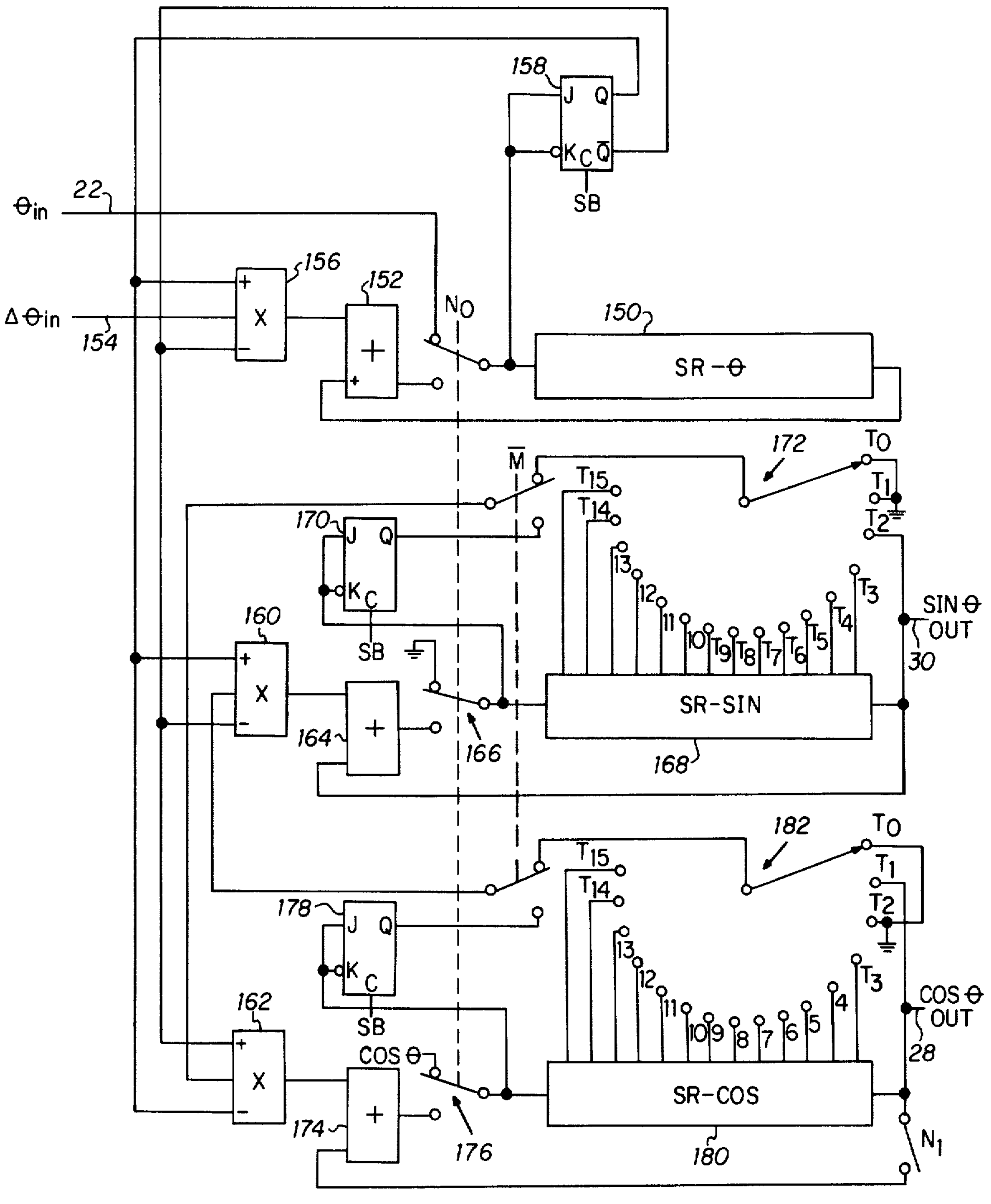

FIG. 3 provides a detailed circuit schematic of the R adder block 60 of FIG. 2;

FIG. 4 provides a detailed circuit diagram of the analog-to-digital integrator block 20 of FIG. 1;

FIG. 5 provides a detailed block diagram of the converter 26 of FIG. 1; and

Figure 6:
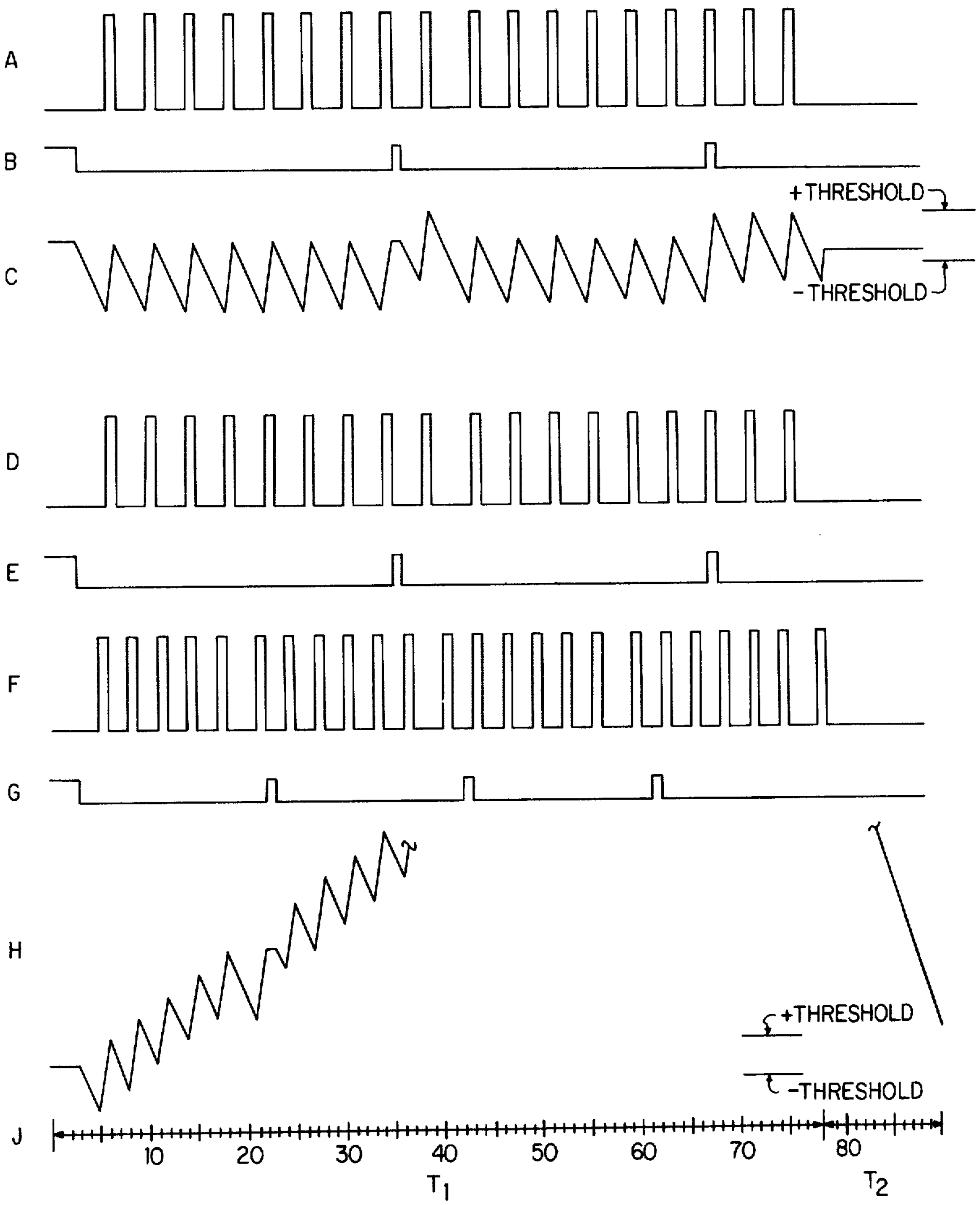

FIG. 6 provides a series of waveforms illustrating the conversion process and is used in explaining the operation of a preferred embodiment.

DETAILED DESCRIPTION

In FIG. 1 two input leads, 10 and 12, are utilized to provide analog input signals of sine and cosine, respectively, to analog-to-digital duty cycle multipliers 14 and 16, respectively, The outputs of these two multipliers are provided on a lead 18 to an analog-to-digital integrator 20 which has outputs 22 and 24. The output 24 is indicative of the rate of the angle change while output 22 is indicative of the angle being converted. Lead 22 is also supplied as an input to a digital angle to sine and cosine converter 26. This converter in the present embodiment is a cordic converter of a type similar to that shown in FIG. 3 of a copending application Ser. No. 439,185 which is assigned to the assignee of the present invention. A first output 28 of converter 26 provided an output digital signal indication of cosine of the angle and lead 28 is supplied as a second input to multiplier 14. A second digital signal output of converter 26 is provided on lead 30 as a second input to multiplier 16. As will be realized, leads 28 and 30 are also used to provide apparatus outputs for the inventive circuit. Thus, the present invention has two analog inputs and four digital outputs.

In FIG. 2 the same designations are used as are provided for multiplier 14 of FIG. 1 where applicable although FIG. 2 is representative of the contents of either of the multipliers 14 or 16. The input 10 is provided through a resistor 33 to a first input 35 of an analog switch 37. Internally to the analog switch 37 is a single pole switch operated by a signal from a lead 51 and which is connected between 35 and an output connected to lead 18. Input 10 is also connected through a resistor 41 to a negative input of a differential amplifier 43 having a feedback resistor 45. An output of amplifier 43 is connected through a resistor 47 to a second input 49 of analog switch 37. This input 49 is supplied through a second switch to output 18. This second switch is operated in accordance with a signal provided on an input lead 39. Both of the switches within analog switch 37 are in a normally open condition and are closed only in response to signals provided on leads 39 and 51. These signals are exclusive and thus the outputs of the two switches can be tied together to lead 18 since they will not be closed simultaneously. A further input in the circuit is a ground lead 53 which is connected to the positive or non-inverting input of amplifier 43 and is also connected through a resistor 55 to an input 57 of the switch 37 for use in the internal switching arrangement. The lower switch contact in switch 37 is closed whenever both of the upper switches are open. As will be realized, many forms of solid state and mechanical or electromechanical switches may be used to provide the switching function within block 37. The digital input signals such as that provided on 28 are provided to an R adder circuit 60 with the lead 28 being connected to a YΔX input therein. A shift register 62 has an input on a lead 63 from an R out terminal of block 60 and provided an output on a lead 65 from the shift register 62 to an $R_{IN}$ terminal of block 60. A pair of leads 67 and 69 are illustrated as +ΔX and −ΔX. In the present embodiment one of these will normally be connected to a logic 1 signal which in this instance is a positive voltage and the other will normally be connected to a logic 0 or ground. A further input illustrated is a sync bit or sign bit input 71. The R adder 60 has outputs connected to the previously indicated 39 and 51 of analog switch 37. Lead 39 is connected to the negative overflow indicator −ΔZ while lead 51 is connected to the positive overflow indicator +ΔZ.

In FIG. 3, a more detailed illustration is provided of the R adder 60 of FIG. 2. The R adder 60 of FIG. 2 is illustrated within the dash lines of FIG. 3. As will be noted, the inputs are provided to a multiplier block 73 whose output is provided to a pair of AND gates as well as to a summing block 75. The previously mentioned AND gates cooperate with inputs on various other leads to provide an indication whenever there is an occurrence of overflow, that is, a condition which exceeds the capacity of the shift register 62. The summing means 75 operates to add the contents of the shift register 62 with any newly supplied digital words. Thus, with enough additions, the capacity of the shift register 62 will be exceeded and the most significant digit will be lost. When the most significant bit of a digital binary number is lost, the effect is to reduce the digital number by one-half or a factor of 2.

The operation of FIG. 3 is believed completely described in conjunction with FIG. 11 of U.S. Pat. No. 3,757,261 in the name of Delaine C. Sather and assigned to the assignee of the present invention. Since this item is known in the art, further detailed explanatory operation of this specific circuit is not herein provided.

In FIG. 4, an input lead 18 provides a signal to the negative or inverting input of an amplifier 80 within a dash line block 82. Amplifier 80 has a positive input connected through a resistor 84 to ground 86 and has a feedback capacitor 88. Block 82 is the analog integrator portion of FIG. 4 with the remaining circuitry providing the conversion to a digital signal. An output of amplifier 80 is provided on a lead 90 to positive and negative threshold detectors 92 and 94, respectively. When the input on lead 90 exceeds a predetermined amount in the positive direction from reference, an output will be provided on lead 96 to a D flip-flop 98 which operates only for complete word times and only upon the simultaneous occurrence of a sync bit as provided on lead 100. An output lead 102 of flip-flop 98 is provided to a $+\Delta X$ input of an R adder 104 and to a similar input of an R adder 106 as well as to an input of an analog switch 108. R adders 104 and 106 may be identical to that of FIG. 3, while analog switch 108 may be identical to that illustrated as block 37 in FIG. 2. When the signal on lead 90 exceeds a predetermined value, normally identical to the positive value, in the negative direction from reference, an output will be obtained on lead 110 from the negative threshold circuit 94. This will provide an input to actuate a D flip-flop 112 upon the next occurrence of a sync bit on lead 100. An output will then be obtained for one full word time on lead 114 of D flip-flop 112 and will be applied to the $-\Delta X$ inputs of R adders 104 and 106 as well as to a second actuating input of analog switch 108. Analog switch 108 has positive and negative reference input leads 116 and 118, respectively, which are connected through resistors to two inputs on the switch 108. An output lead 120 of analog switch 108 is connected to provide a feedback signal to the analog integrator 82 during a specific time period $T_2$. As will be noted, a clock signal supplied on lead 122 is provided to a timing circuit 124 which has the sync bit output 100 as well as an output on lead 126 which is labeled $T_2$ as supplied to the flip-flops 98 and 112 and which is inverted in an inverter 128 to provide an output $T_1$. Since the appearance of a logic 1 on lead 126 will, of necessity, when inverted appear a logic 0 on $T_1$, and since the two signals are exclusive, it can be realized that a single output from 124 may provide both signals. A final output 130 of timer circuit 124 is supplied to first and second shift registers 132 and 134, respectively. The signal on lead 130 operates to clear the shift registers in preparation for a new operation. The shift register 134 is connected between the output and input of R adder 106 and includes an input of logic 0 on a lead 136. The shift register 132 is connected to obtain in input from the R output of R adder 106 and has a circulating lead 138 for circulating the word contained therein until the next loading action signal from lead 130. A lead 140 supplies a constant input $K_2$ to the $Y\Delta X$ input of R adder 106 while a sync bit is supplied by lead 100. A further constant $K_1$ is provided on lead 142 to the $Y\Delta X$ input of R adder 104. A shift register 144 is provided between the output and input of R adder 104 while the R output of 104 is also connected to provide the digital $\theta$ output signal on lead 22. A resistor 146 is connected between ground 86 and a final input of analog switch 108 to serve substantially the same function as lead 57 of FIG. 2.

FIG. 5 is a detailed schematic of a cordic $\theta$ to sine $\theta$, cosine $\theta$ converter. The cordic type converter is old in the art as may be seen from very various articles over the past several years. A very similar cordic converter is further described in my copending application Ser. No. 439,185 filed 4 Feb. 1974 and since the present circuit is merely being provided for completeness of disclosure, only cursory comments will be provided herein as to the operation thereof. However, it will be noted that input lead 22 provided an input signal to a $\theta$ shift register 150 whose output is connected to a summing means 152. A $\Delta\theta_{IN}$ lead 154 is provided to a multiplying means 156 which receives further control inputs from a J-K flip-flop 158 and whose control inputs are also provided to multiplying circuits 160 and 162. An output of multiplier 160 is provided through a summing circuit 164 to a switch generally designated as 166 and whose output is provided to a sine shift register 168. The output of switch of 166 is also used to provide input signals to a J-K flip-flop 170. A multipole switch 172 operates to contact various terminals in sequence over a cycle of words comprising a frame and repeats the operation each word frame. An output of multiplier 162 is provided as an input to a summing means 174 whose output is connected to a switch 176. An output of switch 176 is provided to a J-K flip-flop 178 and also to a cosine shift register 180. A multipole switch 182 is connected to cosine register 180 and may operate coincident with switch 172.

The waveforms of FIG. 6 primarily illustrate the output obtained from the duty cycle multipliers 14 and 16. As an example, the waveforms 6A, D, and F may illustrate the output from multiplier 14 while 6B, E, and G illustrate the output from multiplier 16 for a given set of input signal angles. The waveforms C and H illustrate outputs which may be obtained from lead 90 at the output of the analog integrator of FIG. 4. The waveform J illustrates the relative logic 1 times of the switching signals $T_1$ and $T_2$ appearing on leads 126 and 21 of FIG. 4.

OPERATION

As previously indicated, FIG. 3 illustrates an R adder as may be found in a U.S. Pat. No. 3,757,261. Basically, however, the R adder provides overflow outputs on leads 39 and 51 which indicate that the capacity of shift register 62 has been exceeded. Words are input into shift register 62 by the expedient of placing a logic 1 on either of leads 67 or 69 so as to pass any digital word appearing on lead 28 through multiplier 73 to summing means 75. If no logic 1's appear on 67 or 69, no digital word is passed or, in other words, a zero output is provided. If a logic 1 appears on lead 69, the incoming word on lead 28 is multiplied times −1. Since a logic 1 appearing on lead 67 effectively multiplies the input on lead 28 by +1, it is merely effectively passed to the summing means 65. Summing means 65 adds the incoming digital word to the circulating word from shift register 62 on lead 65. Thus, upon each occurrence of the passage of a digital word through multiplier 73, the magnitude of the word in shift register 62 is changed. If it is increased in either the negative or positive direction such that the capacity of the shift registers 62 is exceeded, an output appears on appropriate lead 39 or lead 51 during the following word time. This also subtracts a value equal to the most significant bit if the sum is positive and adds this value if the sum is negative and since binary words are being utilized in this inventive concept, the effect is to alter the word stored by a factor of 2.

Referring now to FIG. 2, which is the duty cycle multiplier incorporating the R adder of FIG. 3, it will be noted that serial digital words are applied on lead 28 and the overflow outputs appear on leads 39 and 51. If the multiplier of FIG. 2 is incorporated in block 14 of FIG. 1, lead 69 will be connected to ground and lead 67 will be connected to input 21 from the analog to digital integrator 20. If FIG. 2 is to be used as multiplier 16, the opposite connections will occur. In other words, lead 69 will be connected to lead 21 while lead 67 will be connected to ground. The reason for this change in connections of the multiplying inputs of the R adder is that the output of multiplier 16 is effectively subtracted from the output of multiplier 14. This is required since the algorithm upon which the inventive concept is based requires that the product of cosine $\alpha$ sine $\theta$ be subtracted from the product of sine $\alpha$ cosine $\theta$.

If a positive overflow occurs within block 60, an output will appear on lead 51. A signal on this lead will connect input 35 to output lead 18 and thus pass the analog input from lead 10 to the output 18 through resistor 33. The overflow condition or signal appearing on lead 51 is maintained for one word time. If the words used in the inventive concept were 16 bits in length, the signal would appear on lead 51 for the time it takes the 16 clocking pulses to pass a 16 bit serial word into adder 60 on lead 28. If on the other hand, an overflow indication occurs on negative overflow lead 39, the analog input signal is inverted in amplifier 43 and then passed from lead 49 through the analog switch to output lead 18.

As will be realized, the analog input lead of FIG. 2 will supply sine $\alpha$ if FIG. 2 is used for the multiplier 14 and it will provide cosine $\alpha$ if it is used for multiplier 16.

The analog-to-digital intergrator circuit of FIG. 4 receives input signal charges from the two duty cycle multivibrators 14 and 16 on lead 18. It integrates the sum of these two charges for a period equal to the time $T_1$ as illustrated in FIG. 6J, and then converts this value into a time period proportional to this value. The resulting time period $T\Delta\theta$ is then converted into a $\Delta\theta$ signal and summed with the previous $\theta$ value for the previous time period T. This time period is also converted to a $\Delta\theta/\Delta T$ or rate of change signal.

One method of implementing this function is shown in FIG. 4. A timer circuit 124 produces an output on lead 126 which is used in conjunction with an inverter 128 to provide the $T_1$ and $T_2$ time periods. While time periods $T_2$ can be any desired value, it will normally be much shorter then time period $T_1$. During the $T_1$ period, the input signal on 18 is integrated in 82 and the flip-flops 98 and 112 are held in an inactive state so as to maintain the outputs at logic zero on leads 102 and 114. The $T_1$ output on lead 21 is used during the $T_1$ time period to activate the appropriate $\Delta X$ inputs on the R adders of the duty cycle multipliers 14 and 16. During the $T_2$ time, the input from the multipliers on lead 18 is turned off since the $\Delta X$ inputs on the R adders are at logic zero thereby eliminating the further occurrence of overflow conditions to actuate analog switch 37. The D flip-flops 98 and 112 are actuated during the $T_2$ time when clocked by the falling edge of the sync bit signal appearing on lead 100. The inputs to these two flip-flops are driven from the threshold detecting circuits 92 and 94. As previously indicated, these threshold detecting circuits provide outputs only when the inputs exceed a predetermined absolute value. The detector 92 provides the output only when the input exceeds the value in the positive direction with detector 94 providing an output only when the input exceeds the value in the negative direction. While these two thresholds may be different absolute values, the present embodiment used identical values. If the integrator contained a positive signal such as shown in waveform 6H, lead 102 would be placed at a positive value during the entire $T_2$ time period. Thus, the R adders 104 and 106 will be actuated and the constants supplied on leads 142 and 140 will be added in the shift registers 134 and 144. Since the shift register 134 is used to provide rate of change, it must of necessity be cleared to a logic zero prior to the beginning of each $T_2$ time period. Thus, it is loaded with a zero by the action of the loading signal $L_1$ on lead 130. Simultaneous with this action the previously stored signal in shift register 134 is loaded into shift register 132 so as to provide this last computed rate output during the entire next $T_1$ time period. As will be noted from waveform 6H, the signal being detected by positive threshold detector 92 is falling during time period $T_2$. This occurs due to the actuation of analog switch 108 by the signal on lead 102 to provide an input from positive lead 116. This positive signal is passed on lead 120 to the input from positive lead 116. This positive signal is passed on lead 120 to the input of integrator 182 wherein it is inverted and is utilized to reduce the charge on capacitor 88. Waveform 6C illustrates a condition when the trial angle is very close to the analog angle and thus the threshold is exceeded for only a very short time during time period $T_2$ and from then on there is no further correction. In the illustration of waveform 6H, the rate was extremely high since the shift register was being increased during the entire time period $T_2$; however, the rate would be very low for waveform 6C since the shift register would only have one word time input of the $K_2$ constant on lead 140.

The digital $\theta$ to sine $\theta$ and cosine $\theta$ converter of FIG. 5 has been described in connection with my copending application previously referenced. It probably should be mentioned, however, that during the initial word time $N_o$ the $\theta$ shift register 150 is loaded with the digital word $\theta_{in}$ appearing on lead 22 while the sine $\theta$ shift register is loaded with zero. The cosine $\theta$ shift register 180 is loaded at this time with a value equal to cosine arc tangent 1 times cosine arc tangent ½ times cosine arc tangent ¼ times cosine arc tangent ⅛. . . times cosine arc tangent 1/8192 for a 16 bit digital word. The flip-flop 158 determines the sign of the incoming digital word on lead 22. If this word is positive, a $\Delta\theta_{in}$ on lead 154 of 90° is substracted from the signal on lead 22 during word time $N_1$. If $\theta_{in}$ on lead 22 is negative, then $\Delta\theta$ appearing on lead 154 of 90° is added to the $\theta_{in}$ on lead 22 during word time $N_1$. If the input angle is positive, then during the $N_1$ time period the cosine $\theta$ is added to sine $\theta$ and the cosine $\theta$ is made equal to zero. However, if the input angle $\theta_{in}$ on lead 22 is negative, then cosine $\theta$ is subtracted from sine $\theta$. As will be realized from the referenced applications, the $\Delta\theta_{in}$ on lead 154 is a sequence of digital words in fractional angle binary notation with the words in the sequence of 90°, arc tangent 1, arc tangent ½. . . arc tangent 1/18192. At the sine bit time of each word period, the sign of $\theta$ in shift register 150 is determined and the value of $\Delta\theta_{in}$ on lead 154 is subtracted from or added to the angle in 150 to reduce the absolute value thereof. The sine and cosine values are rotated positive for a negative direction of rotation of $\theta$. Thus, if an angle of 36° is applied on lead 22, then the value of the sine at the end of the coversion will be sine 36° and the cosine value will be cosine 36° while the angle $\theta$ in shift register 150 will equal zero.

The waveforms of FIG. 6 are illustrated to provide a clearer understanding of the operation of the multipliers of FIG. 1. As illustrated the waveforms are divided into 90 word times with time period $T_1$ comprising 78 word times and time period $T_2$ comprising 12 word times.

Waveforms A and B illustrate, respectively, the output of multipliers 14 and 16. These waveforms illustrate a condition when the angle $\theta$ equals the analog angle $\alpha$. The angle assumed was 75.9° and as will be realized the cosine of this angle is 0.24. Thus, as illustrated in waveform A, the digital input 0.24 will be added 5 times before overflow occurs. On the next word an overflow indication is provided and the analog signal on lead 10 is passed. Since the sine of 75.9° equals 0.97, an analog pulse which is 0.97% of the maximum allowable is passed for one word time. It then requires several more word times before overflow again occurs. As will be noted, the spacing between pulses is not always identical and specifically while most pulses in waveform A have a word time of 3 words therebetween, one set has four word times between word times 38 and 42. This uneven spacing will always occur when the digital word being added does not have an integer reciprocal.

Proceeding to waveform B, it will be noted that the digital sine $\theta$ is 0.97 and thus overflow will occur on the second word time. Therefore, during the third word time the analog cosine $\alpha$ of 0.24 is passed and overflow will continue every word time thereafter unitl word time 34. As previously explained, multiplier 16 has its outputs subtracted from that of multiplier 14, and thus, the output waveform B is illustrated as going to an increased negative value by 0.24 for each occurrence of overflow. If the waveforms are added together, i.e., the positive portions of waveform 2 with the negative portions of waveform B, it will be determined that the long term averages of the areas involved are identical.

Waveform C illustrates the resultant output from the integrator 20 and shows that the integrated value is or remains substantially at zero. This is true in spite of minor instantaneous variations from an average of zero. At the beginning of time period $T_2$ at word time 78, the total time to integrate back to zero is less than one word time. As will be realized, even this small correction would not occur if the threshold limits illustrated were slightly larger.

Proceeding to waveforms D and E, it will be noted that in this instance the digital angle $\theta$ is left at 75.9° while analog angle $\alpha$ is changed to 71.6°. Under these conditions the overflow in the two multipliers will occur at times identical with the appropriate counterparts in waveforms A and B and the only change will be in the absolute values occurring upon overflow conditions. In other words, waveform D is at 0.95 rather than 0.97 in waveform A whereas waveform E is −0.32 rather than −0.24 as in waveform B. Waveform H was drawn specifically to illustrate the action of integrator 20 in response to waveforms F and G but the general slope would accurately reflect the action of integrator 20 with respect to waveforms D and E.

Proceeding to waveforms F and G, it will be noted that in this instance the digital angle $\theta$ is assumed to be 71.6° while the analog angle $\alpha$ is 75.9. Thus, the positive waveforms of 6F are a value of 0.97 but occur at a higher frequency than occurred in waveform A. With respect to waveform G, it will be noted that while the negative amplitude is 0.24, that there are not as many negative pulses. Thus, with more positive pulses and less negative pulses there will be a net positive value occurring within integrator 20. Waveform H has only been illustrated up to time period 36 but it will be realized that it would continue to rise at the same average rate for the entire time period $T_1$. The value within the integrator 20 would then be decreased during the entire time period $T_2$ and as shown would almost approach positive threshold at the end of time period $T_2$. Thus, an assumption may be made that as illustrated the converter could change by an increment of approximately 4° (75.9°–71.6°) during each $T_2$ time period.

Referring again to FIG. 1, it will be realized from the above discussions that the block diagram illustrated operates relatively slowly but provides very high resolution. The operation is accomplished by providing a trial angle $\theta$ which is then converted to sine and cosine of that angle $\theta$ in digital serial words. These digital serial words are then used in analog-to-digital duty cycle multipliers to provide positive and negative outputs which are integrated in block 20 to alter the trial angle by a small amount to produce a new trail angle. Since each trial angle is changed by only a very few degrees, it may take several complete cycles of operation before the trial angle is identical to the analog angle represented by the sine and cosine signals. In view of the method of generating the trial angle, it is very simple to add a rate circuit for obtaining an output indicative of the rate of change during each comparison cycle.

While the present embodiment used specifically a cordic converter an analog-to-digital duty cycle multipliers to implement the invention, it is to be realized that other converters and multipliers would satisfactorily operate and therefore, I wish to be limited not by the specific embodiment shown but only by the scope of the appended claims.

I claim:

1. Conversion apparatus comprising, in combination:

first and second duty cycle multipliers, each including first and second signal inputs and a product output;

first and second means for supplying first and second analog signals indicative respectively of sine $\alpha$ and cosine $\alpha$ connected to said first signal inputs of respectively of said first and second multipliers;

conversion means, including input means and first and second outputs, for providing digital output signals at said first and second outputs thereof in response to digital signals supplied to said input means thereof, the output signals being indicative of cosine $\theta$ at said first output and sine $\theta$ at said second ouput when $\theta$ is applied to the input thereof;

means for connecting said first and second outputs of said conversion means to said second inputs of said first and second multipliers respectively; and analog-to-digital integrating means connected between said outputs of said multipliers and said input of said conversion means for providing to said conversion means a digital signal $\theta$ obtained from integrating the difference of the product signals obtained from said multipliers.

2. Apparatus as claimed in claim 1 wherein:

said integrating means includes additional output means for providing a digital signal indicative of rate of change of $\theta$ with time ($\Delta\theta/\Delta t$).

3. The apparatus of claim 1 wherein each of said duty cycle multipliers includes:

analog switch means including first and second signal inputs, control means and output means, said output of said analog switch being connected to said product output of said multiplier;

cumulative adding means connected between said second input of said multiplier and said control means of said analog switch for switching said analog switch to a predetermined one of the two conditions during a word time following each overflow of the cumulative adding process, the cumulative sum being reduced by a predetermined amount after each overflow occurrence; and means connected between said first signal input of said multiplier and the first and second signal inputs of said analog switch for providing both the inverted and non-inverted versions of the multiplier input signal thereto, said analog switch passing only one of the two input signals at a given time and only in accordance with and after an overflow condition of said cumulative adding means.

4. Apparatus as claimed in claim 1 wherein said integrating means includes:

an analog integrator connected to said product output of said multiplier means and including an output for providing a signal indicative of the difference of the integrated values received from said multipliers;

cumulative adding means for continuously adding a constant for as many word times as a control signal is received and adding the constant either positively or negatively in accordance with the control signal, the output of said cumulative adding means being connected to the output of said analog-to-digital integrating means for providing the output digital signal $\theta$;

first and second signal amplitude detection means, each including a threshold detecting input for providing control signal outputs indicative respectively of the input signals applied thereto exceeding a predetermined amplitude in the positive and negative directions from a reference respectively;

means connecting the output of said integrator to said threshold detecting inputs of said amplitude detection means;

switch means providing first and second time intervals each having a duration of a plurality of word times during which the integrator means operates, the integrator receiving input signals only during the first time period and the cumulative adding means receiving control signals from said amplitude detection means only during said second time interval; and further means connected between said detection means and said analog integrator for reducing the integrator output during the occurrence of the control signal supplied by said detection means.

5. Apparatus as claimed in claim 4 wherein said integrating means additionally includes a second cumulative adding means connected to said signal amplitude detection means for cumulatively adding from zero, during each occurrence of the second time period, a second constant for as long as the input to the amplitude detection means exceeds the threshold during the second time period.

6. The method of electrically converting from two electrical analog signals indicative of sine and cosine of an angle $\alpha$ to two electrical digital signals indicative of sine and cosine of the same angle in calculating apparatus comprising, the steps of:

generating a trial angle $\theta$;

converting the trial angle $\theta$ to digital first and second signals indicative, respectively, of sine $\theta$ and cosine $\theta$;

cumulatively adding said sine $\theta$ and cosine $\theta$ signals separately and providing overflow third and fourth signals, respectively, for a predetermined length of the time following the occurrence of each overflow signal;

generating a fifth signal having a magnitude of analog cosine $\alpha$ and during each occurrence of said third signal;

generating a sixth signal having a magnitude of analog sine $\alpha$ during each occurrence of said fourth signal;

combining said fifth and sixth signals to obtain a different control signal; and modifying said trial angle $\theta$ until the fifth and sixth signals no longer produce a significant control signal.

7. Apparatus for converting from two analog signals indicative of sine and cosine of an angle $\alpha$ to two digital signals indicative of sine and cosine of the same angle comprising, in combination:

first meams for generating a trial angle $\theta$;

second means, connected to said first means, for converting the trial angle $\theta$ to digital first and second signals indicative respectively of sine $\theta$ and cosine $\theta$;

third means and fourth means, connected to said second means, for cumulatively adding said sine $\theta$ and cosine $\theta$ signals separately and providing overflow third and fourth signals, respectively, for a predetermined length of time following the occurrence of each overflow signal;

fifth means, connected to said fourth means, for generating a fifth signal having a magnitude of analog cosine $\alpha$ and during each occurrence of said third signal;

sixth means, connected to said third means, for generating a sixth signal having a magnitude of analog sine $\alpha$ during each occurrence of said fourth signals;

seventh means, connected to said fifth and sixth means, for combining said fifth and sixth signals to obtain a different control signal; and eighth means, connecting said seventh means to said first means, for modifying said trial angle $\theta$ until the fifth and sixth signals no longer produce a significant control signal.

* * * * *

UNITED STATES PATENT OFFICE

CERTIFICATE OF CORRECTION

PATENT NO. : 3,896,299

DATED : July 22, 1975

INVENTOR(S) : Melvin H. Rhodes

It is certified that error appears in the above-identified patent and that said Letters Patent are hereby corrected as shown below:

Column 1, line 36, delete "trail" and substitute therefor --trial--;

Column 7, line 21, delete "1/18192" and substitute therefor --1/8192--; and line 61, delete "unitl" and substitute therefor --until--.

Signed and Sealed this

*thirtieth* Day of *September 1975*

[SEAL]

*Attest:*

RUTH C. MASON
*Attesting Officer*

C. MARSHALL DANN
*Commissioner of Patents and Trademarks*